United States Patent [19]

Grosch et al.

[11] 3,836,170
[45] Sept. 17, 1974

[54] DEVICE FOR THE INFLATION OF SAFETY CUSHIONS IN VEHICLES

[75] Inventors: Ernst Grosch, Hennef/Sieg; Heinz Gawlick, Furth; Hellmut Bendler, Erlangen-Spardorf; Karl-Egon Flach, Cologne, all of Germany

[73] Assignee: Dynamit Nobel AG., Troisdorf, Germany

[22] Filed: Apr. 24, 1972

[21] Appl. No.: 246,944

[30] Foreign Application Priority Data
Apr. 26, 1971 Germany.............................. 2120277

[52] U.S. Cl. ................ 280/150 AB, 222/5, 137/68
[51] Int. Cl. ............................................ B60r 21/08
[58] Field of Search..... 280/150 AB; 222/5; 137/67, 137/68

[56] References Cited
UNITED STATES PATENTS 3,008,479  11/1961  Mancusi................................. 222/5
3,266,668  8/1966  Davis..................................... 222/5
3,642,304  2/1972  Johnson....................... 280/150 AB
3,653,684  4/1972  Plumer......................... 280/150 AB
3,655,217  4/1972  Johnson....................... 280/150 AB
3,663,036  5/1972  Johnson................................. 222/5

FOREIGN PATENTS OR APPLICATIONS
854,003  11/1960  Great Britain......................... 222/5

Primary Examiner—David Schonberg
Assistant Examiner—John P. Silverstrim
Attorney, Agent, or Firm—Craig & Antonelli

[57] ABSTRACT

Device for the inflation of safety cushions in motor vehicles wherein a single electrically actuatable charge is disposed in a case provided in one end of a container filled with gas under pressure, one side of said case facing the other end of said container being rupturable by said charge, and an axially displaceable member disposed in said container for rupturing the end of said container upon rupture of the one side of said case.

24 Claims, 5 Drawing Figures

PATENTED SEP 17 1974  3,836,170

SHEET 1 OF 2

DEVICE FOR THE INFLATION OF SAFETY CUSHIONS IN VEHICLES

This invention relates to a device for the inflation of safety cushions or bags in vehicles, especially automotive vehicles.

As is known, systems are being developed at this time which are designed to increase the safety of occupants of motor vehicles in case of impact with an obstacle or when a predetermined deceleration value has been exceeded. In such systems, bags disposed in the interior of the vehicle are automatically inflated, and thus are spread protectively in front of the occupants in response to impact or other cause of rapid deceleration.

For the inflation of the safety bag, various methods of connecting a pressure medium to the bag have been suggested. For example, the use of pressure bottles filled with highly compressed gas, such as compressed air, is well known. This gas, at the time the system is actuated, is strongly heated by the combustion of powder or similar propellants, and thus is additionally considerably enlarged with respect to its original volume.

In this connection, it is also conventional to provide the powder charge in the form of a cartridge disposed on the longitudinal axis of a pressure bottle on one end thereof. In this device, after the ignition of the cartridge, the thus-produced pressure of the powder gases punches a predetermined zone out of the bottom of the pressure bottle, which zone is defined by means of a predetermined rupturing line, and the powder gas then flows into the pressure bottle and heats the compressed gas present therein. At the other end of the pressure bottle, a further powder charge is provided which serves to produce an additional opening in the pressure bottle for the discharge of the compressed gas into the bag via a diffuser. Unfortunately, the proper cooperation of two powder charges always entails a certain lack of safety which, however, cannot be tolerated in this instance, since under certain circumstances the life or death of one or more people can be involved.

It is an object of this invention to eliminate the characteristics of known systems which impair the safety thereof. Therefore, the invention suggests a system including an elongated pressure bottle filled with a highly compressed gas and a cartridge having an electrically ignitable, preferably explosive-free pyrotechnic powder charge, which cartridge is arranged at one end of the pressure bottle and preferably coaxially therein. This device is also characterized in that between the powder charge and the other end of the pressure bottle, as seen in the axial direction, an axially displaceable element is provided, and that the other end of the pressure bottle is fashioned as a valve seal actuatable by the element and fashioned as a bursting member.

The arrangement of the present invention affords the advantage that only a single propellant powder charge is required even in the case of tubular, elongated containers or pressure bottles, in order to provide the required opening for the entrance of the powder gases into the pressure bottle, as well as also the necessary opening for the discharge of the compressed gas into the diffuser and further into the bag. In this connection it is then merely a question of structural design and dimensioning of the device to achieve an effect on and control over the chronological sequence of the individual procedures, the pressure characteristic, and so on, in the desired manner.

In accordance with a further suggestion of the invention, the provision is made to extend the case for the powder charge beyond the charge in the direction toward the other end of the pressure bottle, and to arrange perforations along the periphery of the case in the zone of the extended portion. This extension then serves as a guide for the valve plate disposed in front of the powder, after it has been punched out by the powder gases. The same, of course, also holds true when fashioning the valve plate in the manner of a projectile, although the provision can also be made for this purpose, of course, to design such projectile to be essentially smaller in diameter than the inside diameter of the case extension. In order to achieve pressure equalization between the interior of the case extension and the remainder of the interior of the container, apertures are arranged in the extension, preferably on the periphery at the free forward end, especially when the extension, according to this invention, is fashioned to reach up to the other end of the pressure bottle.

In case a projectile-type element is provided, it proves advantageous, according to the present invention, to dispose a trap or collecting device beyond the other end of the pressure bottle, to prevent the element from being forced into the diffuser or bag and possibly rendering the functioning of the entire system doubtful. This trap must then, of course, be provided with openings for the penetration of the gases, it being most logical to arrange the same at the periphery of the trap.

In accordance with another feature of the invention, the element effecting the opening of the pressure bottle toward the diffuser and/or the bag is fashioned as a tubular section extending in an axially displaceable manner between the cylindrical portion of the pressure bottle and the case or its extension. With such a construction, this tubular section is guided in the pressure bottle by means of cams of a pin-type or the like form. The cams can be made to extend toward the inside in the direction of the extension of the case and/or toward the outside, facing the wall of the pressure bottle. At the end removed from the powder charge, i.e., the end facing the diffuser or the bag, the tubular section is sealed by a bottom and fashioned with a pin-like projection extending toward the bag. This projection can be in direct connection with the bottom of the pressure bottle on the bag side, which bottom is preferably formed as a bursting element, or it can have a certain spacing therefrom. In the latter case, a compression spring is provided between the bottom of the pressure bottle and the bottom of the tubular section.

In order to ensure that the discharge of the pressure gases into the diffuser and/or into the bag takes place with certainty in any event, the invention provides the bottom of the pressure bottle on the diffuser side on the interior with a supporting ring perforated at its circumference. Of course, this supporting ring could, however, also be arranged at the bottom of the tubular section.

These and other objects, features and advantages of the present invention will become more apparent from the following detailed description when taken in conjunction with the accompanying drawing, which illustrates several embodiments of the present invention, and wherein.

Figure 1:
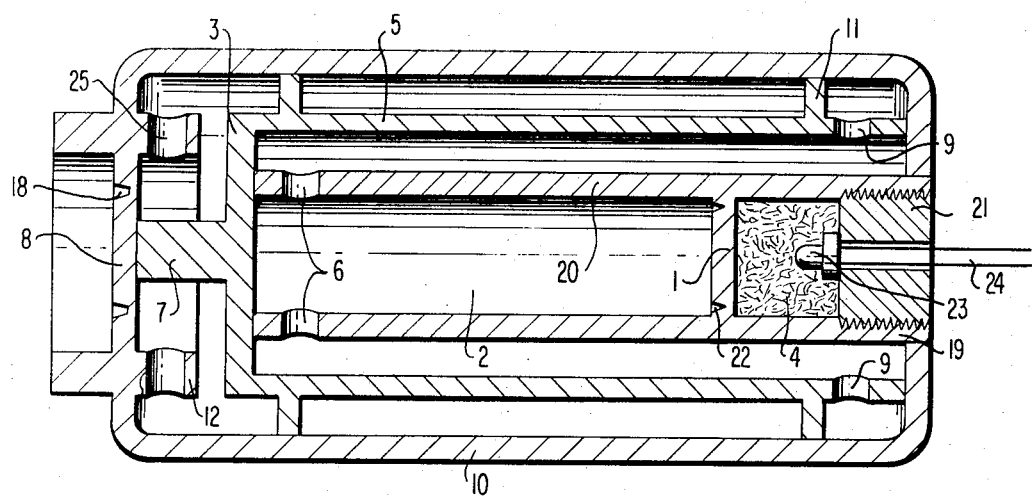
FIG. 1 is a longitudinal sectional view of a pressure bottle with an inner tube in accordance with the embodiment of the invention.

According to FIG. 1, the pressure bottle, i.e., the container 10, is sealed at one end by means of a bursting diaphragm 8, defined as to its size by the predetermined rupturing line 18. At the other end of the container 10, there is disposed a case 19 having an extension 20. The powder charge 4 accommodated in the case 19 is enclosed at the end of the container by means of the threaded screw plug 21 and is confined at the other end by means of the bursting diaphragm 1, again defined in size by the predetermined rupturing line 22. In order to ignite the powder charge 4 by the primer pellet 23, the latter is connected, by means of the lead wires 24, with a source of electrical energy, not shown. The free end of the extension 20 is in contact with the bottom 3 of the inner tube 5, positioned for proper spacing within the container 10 by means of pins 11 and being displaceable therein in the axial direction.

The entire inner space of the container 10 is filled with compressed gas. In this connection, in order to obtain pressure equalization in all portions of the container, the openings 6 are provided in the extension 20 and the openings 9 are formed in the inner tube 5.

The bottom 3 of the inner tube 5 is provided with a pinshaped central projection 7, the latter contacting the bursting diaphragm 8 with its end face. The supporting ring 12, extending toward the interior of the container, is formed with apertures 25 along its periphery.

If, after a predetermined deceleration value has been exceeded and/or upon an impact with an obstacle, the pellet 23 and thus the powder charge 4 is ignited via the wires 24 by a source of electrical energy, which is not shown, for example the car battery, due to a signal from a sensor or the like, because of the developing pressure of the powder gases, the diaphragm 1 is first punched out along the predetermined rupturing line 22 and thereafter the inner tube 5 is axially displaced until the bottom 3 thereof contacts the supporting ring 12. At the same time the diaphragm 8 is punched out along the predetermined rupturing line 18 by the projection 7, whereupon the pressure gases can flow out via the openings 25 as well as through the opening uncovered by the diaphragm 8, via a diffuser (not shown) into a conventional safety bag (which likewise is not shown) so as to fill this bag. The pressure medium present in space 2 as well as between the extension 20 and the inner tube 5 can continue to flow via the openings 6 and 9. By the arrangement and configuration of the various openings, it is ensured that the gases do not flow out of the container 10 in the axial direction under too high a pressure and furthermore, by the guidance of the pressure gases, the flame formed upon ignition of the powder charge is prevented from exiting out of the container.

Figure 1A:
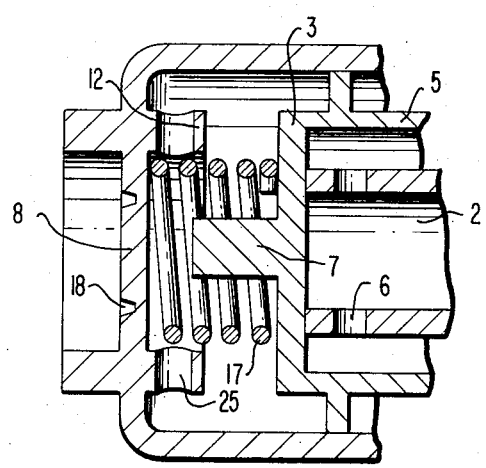
FIG. 1a is a detail view partly in section of a modification of the embodiment of FIG. 1.

The modification shown in FIG. 1a does not differ in principle from the embodiment of FIG. 1 with respect to its mode of operation. However, due to the fact that the projection 7 does not directly rest on the diaphragm 8, a longer path is naturally provided between the projection 7 on the bottom 3 of the inner tube 5 and the diaphragm 8. By provision of the compression spring 17, the inner tube 5 is fixed in its rearward position until the ignition is triggered. After the gas pressure diminishes subsequent to triggering, the inner tube is returned to this original position. Moreover, the spring 17 effects an attenuation of the impingement of the bottom 3 upon the supporting ring 12.

Figure 2:
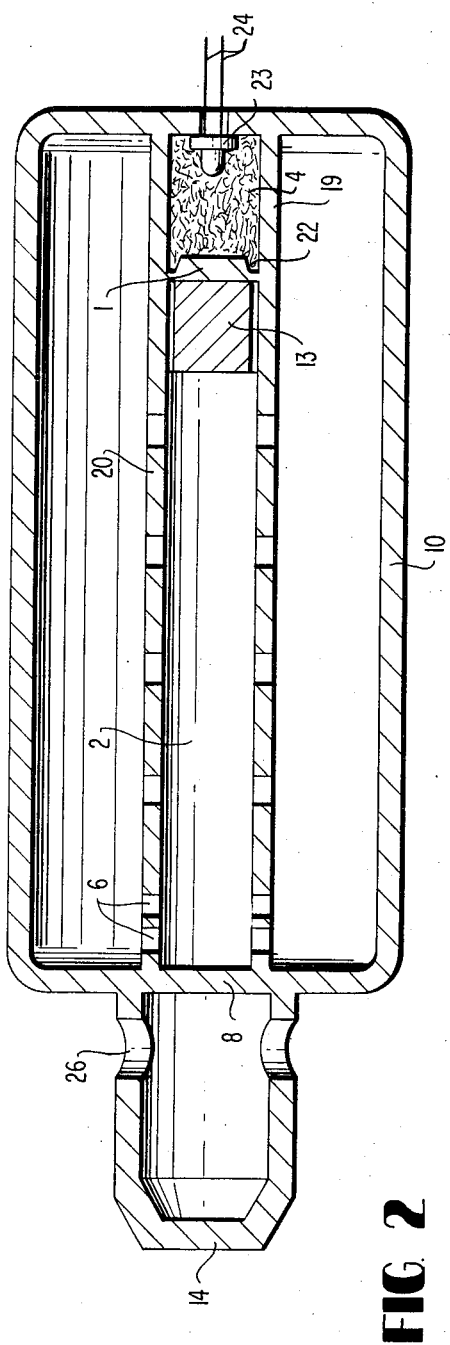
FIG. 2 is a longitudinal sectional view of a pressure bottle with an extension of the powder charge case extending to the bottom on the diffuser side.

According to FIG. 2, a tube extending from one front end to the other is disposed in the container 10, which tube forms the case 19 with the extension 20 defining the space 2. The type of mounting is not illustrated in detail. In front of the powder charge 4, the diaphragm 1 with the predetermined rupturing line 22 is again provided; likewise, the pellet 23 with electrical leads 24 is disposed therein for ignition purposes. The openings 6 are formed in the extension 20 for pressure equalization between the space 2 and the remaining space of the container 10. The diaphragm 1 is connected with the element 13. On the outside of the end face of container 10 removed from the powder charge 4, a trap 14 formed like a blind hole is disposed having gas discharge openings 26.

After ignition of the powder charge 4, the diaphragm 1 is punched out along the predetermined rupturing line 22 and fired, by the pressure of the powder gases, together with element 13 through the extension 20. During this step, the diaphragm 8 is penetrated and thus the pressure gases are free to flow via the openings 26 and a diffuser (not shown) into the bag to be inflated. The trap 14 is fashioned in such a manner that the element 13 with the diaphragm 1 is collected so that the efflux of gas is not impeded thereby.

Figure 2B:
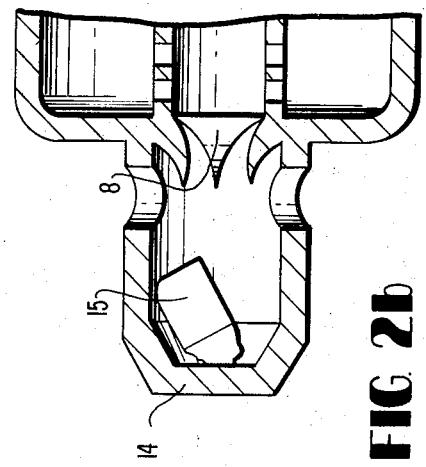
FIG. 2b is a detail view similar to FIG. 2a after the bottom of the pressure bottle has been opened by a projectile-like element.
Figure 2A:
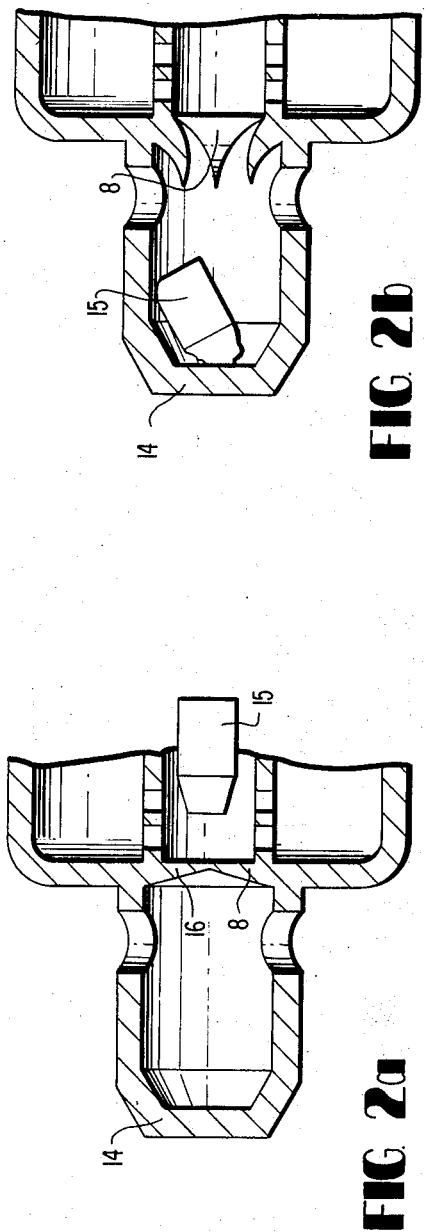
FIG. 2a is a detail view partly in section of a variation of the embodiment of FIG. 2 prior to opening.

According to FIG. 2a, a projectile 15 is provided for penetrating the diaphragm 8 provided with the rupturing groove 16. This projectile has a smaller diameter than the inner diameter of the extension 3. The projectile 15 can be disposed either in front of or behind the diaphragm 1, with respect to the powder charge 4, and can, of course, exhibit varying shapes.

As can be seen from FIG. 2b, the projectile 15 has penetrated the diaphragm 8 and has torn the same in a starshaped manner, before it is caught in the trap 14 in such a manner that the efflux of the pressure gas is not impeded thereby.

The extension 20, in the embodiment of FIGS. 2, 2a, and 2b need not necessarily extend up to the diaphragm 8; however, it should, in any event, be of such a length that it provides a sufficiently secure guide for the parts propelled by the powder charge that the diaphragm 8 is penetrated with certainty in the desired manner. For this purpose, the diaphragm 8 will suitably be made to be larger than the diaphragm 1. The arrangement of the openings 6 can be provided, in this embodiment, in any desired manner.

What is claimed is:

1. Device for the inflation of safety cushions comprising an elongated pressure container filled with a highly compressed gas, a case disposed in one end of said container entirely enclosing an ignitable, pyrotechnical powder charge, and an axially displaceable element disposed between said case and the other end of said container, said other end of said container having a rupturable portion which will burst open when contacted by said axially displaceable element, wherein the surface portion of said case facing said other end of said container is formed as a rupturable member movable toward said other end of said container upon ignition of saiid powder charge, wherein said axially displaceable element is formed as an inner tube axially disposed within said container, wherein said inner tube has a substantially closed end positioned adjacent said other end of said container and between said rupturable member of said case and said rupturable portion of said container such that movement of said rupturable member against said closed end of said inner tube causes movement of said inner tube in a direction toward said rupturable portion of said container, wherein said inner tube has a projection extending from said closed end in facing relationship to said rupturable portion of said container such that said projection forcibly contacts said rupturable portion to burst open said container upon a predetermined movement of said inner tube, and wherein said projection on said inner tube is spaced from said other end of said container by a coil spring disposed between said inner tube and said container.

2. Device for the inflation of safety cushions comprising an elongated pressure container filled with a highly compressed gas, a case disposed in one end of said container entirely enclosing an ignitable, pyrotechnical powder charge, and an axially displaceable element disposed between said case and the other end of said container, said other end of said container having a rupturable portion which will burst open when contacted by said axially displaceable element, wherein the surface portion of said case facing said other end of said container is formed as a rupturable member movable toward said other end of said container upon ignition of said powder charge, wherein said axially displaceable element is formed as an inner tube axially disposed within said container, wherein said inner tube has a substantially closed end positioned adjacent said other end of said container and between said rupturable member of said case and said rupturable portion of said container such that movement of said rupturable member against said closed end of said inner tube causes movement of said inner tube in a direction toward said rupturable portion of said container, wherein said inner tube has a projection extending from said closed end in facing relationship to said rupturable portion of said container such that said projection forcibly contacts said rupturable portion to burst open said container upon a predetermined movement of said inner tube, and wherein said case includes a cylindrical extension disposed inside of said inner tube and directed toward said other end of said container and provided with at least one aperture to equalize the pressure within said container.

3. Device for the inflation of safety cushions as defined in claim 2, wherein said cylindrical extension terminates at said other end of said container against said substantially closed end portion of said inner tube.

4. Device for the inflation of safety cushions comprising an elongated pressure container filled with a highly compressed gas, a case disposed in one end of said container entirely enclosing an ignitable pyrotechnical powder charge, said case having a rupturable member formed at a side of said case which faces the other end of said container, and an axially displaceable element disposed between said case and the other end of said container, said other end of said container having a rupturable portion which will burst open when contacted by said axially displaceable element, wherein said case includes a tubular extension which extends from said rupturable member of said case to said rupturable portion at the other end of said container where it is fixed to said container such that said extension forms a continuous tubular guide of substantially constant cross-section along the length thereof from said rupturable member to said rupturable portion for guiding movement of said axially displaceable member from said case to a position directly engaging said rupturable portion of said container, said tubular extension being surrounded by and spaced from inner walls of said container along the length of said tubular extension, said tubular extension including a plurality of continuously open holes for equalizing the pressure therein with that inside the remainder of the container,

- wherein a trap in the form of a cup-shaped member having a plurality of peripheral holes therein is disposed over the outer surface of said other end of said container, and
- wherein said container, said case, said tubular extension, and said trap are formed as an integral one-piece structure.

5. Device for the inflation of safety cushions as defined in claim 4 wherein said axially displaceable element is formed as one-piece with said rupturable member.

6. Device according to claim 4, wherein the surface portion of said case facing said other end of said container is formed as said rupturable member which is movable toward said other end of said container upon ignition of said powder charge, and wherein said axially displaceable element is connected to and movable with said rupturable member.

7. Device according to claim 4, wherein said axially displaceable element is a projectile having a smaller cross-sectional dimension than the inner dimensions of said tubular extension and which penetrates through the rupturable portion of said container while tearing the same in a starshaped manner upon ignition of said powder charge.

8. Device according to claim 7, wherein all of the peripheral holes in said trap are located at the end nearest the rupturable portion, and wherein said trap is dimensioned such as to have sufficient room to accommodate said axially displaceable element in a position spaced in the direction of travel of said axially displaceable element outwardly of said peripheral holes in said trap.

9. Device according to claim 4, wherein said tubular extension is cylindrical in shape with the cylinder axis extending in a direction from said case toward said rupturable portion.

10. Device according to claim 4, wherein all of the peripheral holes in said trap are located at the end nearest the rupturable portion, and wherein said trap is dimensioned such as to have sufficient room to accommodate said axially displaceable element in a position spaced in the direction of travel of said axially displaceable element outwardly of said peripheral holes in said trap.

11. Device according to claim 4, wherein all of the peripheral holes in said trap are located at the end nearest the rupturable portion, and wherein said trap is dimensioned such as to have sufficient room to accommodate said axially displaceable element in a position spaced in the direction of travel of said axially displaceable element outwardly of said peripheral holes in said trap.

12. Device according to claim 4, wherein said tubular member and said container are formed as concentric cylinders.

13. Device for the inflation of safety cushions comprising an elongated pressure container filled with a highly compressed gas, a case disposed in one end of said container entirely enclosing an ignitable, pyrotechnical powder charge, and an axially displaceable element disposed between said case and the other end of said container, said other end of said container having a rupturable portion which will burst open when contacted by said axially displaceable element, wherein the surface portion of said case facing said other end of said container is formed as a rupturable member movable toward said other end of said container upon ignition of said powder charge, wherein said axially displaceable element is formed as an inner tube axially disposed within said container, wherein said inner tube has a substantially closed end positioned adjacent said other end of said container and between said rupturable member of said case and said rupturable portion of said container such that movement of said rupturable member against said closed end of said inner tube causes movement of said inner tube in a direction toward said rupturable portion of said container, wherein said inner tube has a projection extending from said closed end in facing relationship to said rupturable portion of said container such that said projection forcibly contacts said rupturable portion to burst open said container upon a predetermined movement of said inner tube, and wherein said inner tube is positioned concentrically within said container by a plurality of outwardly extending spacer members.

14. Device for the inflation of safety cushions as defined in claim 13, wherein said inner tube has a plurality of apertures therein to equalize the pressure in said container.

15. Device for the inflation of safety cushions comprising an elongated pressure container filled with a highly compressed gas, a case disposed in one end of said container entirely enclosing an ignitable, pyrotechnical powder charge, and an axially displaceable element disposed between said case and the other end of said container, said other end of said container having a rupturable portion which will burst open when contacted by said axially displaceable element, wherein the surface portion of said case facing said other end of said container is formed as a rupturable member movable toward said other end of said container upon ignition of said powder charge, wherein said axially displaceable element is formed as an inner tube axially disposed within said container in surrounding spaced relationship with respect to said rupturable member, wherein said inner tube has a substantially closed end positioned adjacent said other end of said container and between said rupturable member of said case and said rupturable portion of said container such that movement of said rupturable member against said closed end of said inner tube causes movement of said inner tube in a direction toward said rupturable portion of said container, and wherein said inner tube has a projection extending from said closed end in facing relationship to said returnable portion of said container such that said projection forcibly contacts said rupturable portion to burst open said container upon a predetermined movement of said inner tube.

16. Device for the inflation of safety cushions as defined in claim 15, wherein a supporting ring is formed on the inner surface of said other end of said container to serve as a stop member for said inner tube.

17. Device for the inflation of safety cushions as defined in claim 16, wherein said ring is provided with appertures to reduce the resistance to gas flow thereby.

18. Device for the inflation of safety cushions as defined in claim 17, wherein said projection on said inner tube is spaced from said other end of said container by a coil spring disposed between said inner tube and said container.

19. Device as defined in claim 15, wherein said rupturable member is bounded by a predetermined rupturing line formed in said surface portion of said case.

20. Device as defined in claim 19, wherein said case includes a cylindrical extension disposed inside of said inner tube and directed toward said other end of said container and provided with at least one aperture to equalize the pressure within said container.

21. Device as defined in claim 20, wherein said device includes means accommodating its use in vehicles, particularly automotive vehicles and such that inflation of the safety cushions is in response to a signal generated upon detection of a predetermined deceleration of the vehicle.

22. Device as defined in claim 20, wherein said powder charge is explosive free.

23. Device as defined in claim 15, wherein said device includes means accommodating its use in vehicles, particularly automotive vehicles and such that inflation of the safety cushions is in response to a signal generated upon detection of a predetermined deceleration of the vehicle.

24. Device as defined in claim 15, wherein said powder charge is explosive free.

* * * * *